(12) United States Patent
Jodka et al.

(10) Patent No.: US 12,323,045 B2
(45) Date of Patent: Jun. 3, 2025

(54) DRIVER STAGE WITH AN INTERMEDIATE CIRCUIT

(71) Applicant: Renesas Design (UK) Limited, Bourne End (GB)

(72) Inventors: Eduardas Jodka, Freiburg (DE); Turan Solmaz, Istanbul (TR)

(73) Assignee: Renesas Design (UK) Limited, Bourne End (GB)

( * ) Notice: Subject to any disclaimer, the term of this patent is extended or adjusted under 35 U.S.C. 154(b) by 69 days.

(21) Appl. No.: 18/066,708

(22) Filed: Dec. 15, 2022

(65) Prior Publication Data

US 2024/0204648 A1 Jun. 20, 2024

(51) Int. Cl.
*H02M 1/084* (2006.01)
*H02M 1/00* (2006.01)
(Continued)

(52) U.S. Cl.
CPC ......... *H02M 1/084* (2013.01); *H02M 1/0054* (2021.05); *H02M 1/08* (2013.01); *H02M 1/088* (2013.01)

(58) Field of Classification Search
CPC ............. H02M 1/0006; H02M 1/0029; H02M 1/0048; H02M 1/0054; H02M 1/08; H02M 1/084; H02M 1/0845; H02M 1/088; H02M 3/02; H02M 3/04; H02M 3/10; H02M 3/135; H02M 3/155; H02M 3/1552; H02M 3/1555; H02M 3/156; H02M 3/157; H02M 3/158; H02M 3/1582; H02M 3/1588; H02M 3/335; H02M 3/33561; H02M 1/0058; H02M 1/083; H02M 1/38; H03K 17/00; H03K 17/04; H03K 17/041; H03K 17/04106; H03K 17/04113; H03K 17/0412; H03K 17/04123; H03K 17/04126; H03K 17/06; H03K 17/063; H03K 17/081; H03K 17/08104; H03K 17/08112; H03K 17/08116; H03K 17/0812; H03K 17/08122; H03K 17/08126; H03K 17/08128
USPC ........ 323/265, 266, 271–275, 282–285, 289, 323/351; 363/63, 74, 123, 124; 327/108–112
See application file for complete search history.

(56) References Cited

U.S. PATENT DOCUMENTS

| 7,394,298 B2 * | 7/2008 | Hazucha | H03K 4/023 327/170 |
| 2016/0043624 A1 * | 2/2016 | Jarvinen | H02M 1/084 323/271 |

(Continued)

*Primary Examiner* — Thienvu V Tran
*Assistant Examiner* — Carlos O Rivera-Perez
(74) *Attorney, Agent, or Firm* — SCULLY, SCOTT, MURPHY & PRESSER, P.C.

(57) ABSTRACT

A driver stage configured to switch an output node between a high-side potential and a low-side potential. The driver stage includes a high-side switch arranged between the high-side potential and the output node, a low-side switch arranged between the output node and the low-side potential, and an intermediate circuit arranged between the output node and an intermediate potential, wherein the intermediate potential lies between the high-side potential and the low-side potential. Furthermore, the driver stage includes a control unit configured to operate the driver stage at least in a high-side phase, in a low-side phase and in an intermediate phase.

9 Claims, 8 Drawing Sheets

(51) Int. Cl.
   *H02M 1/08*     (2006.01)
   *H02M 1/088*    (2006.01)

(56) References Cited

U.S. PATENT DOCUMENTS

2018/0175859 A1\*  6/2018  Jansen ............. H03K 19/00338
2020/0204171 A1\*  6/2020  Stoerk ............. H03K 17/08142
2020/0389163 A1\* 12/2020  Apelsmeier ........... B60L 15/007

\* cited by examiner

DRIVER STAGE WITH AN INTERMEDIATE CIRCUIT

TECHNICAL FIELD

The present document relates to a driver stage for a capacitive, inductive and/or resistive load, wherein the driver stage comprises an intermediate, in particular a return-to-zero (RZ), circuit.

BACKGROUND

A driver stage for a capacitive, inductive and/or resistive load may be used e.g., within a DC/DC power converter. The driver stage comprises a high-side switch and a low-side switch, which are arranged in series between a high-side potential and a low-side potential and which are configured to couple a load that is coupled to the output node between the high-side switch and the low-side switch with the high-side potential and with the low-side potential in an alternating and mutually exclusive manner.

The switching operations of the high-side switch and the low-side switch cause power losses of the driver stage. The present document is directed at the technical problem of reducing the power consumption of a driver stage in a reliable manner.

SUMMARY

According to an aspect, a driver stage configured to switch an output node (to with a load is coupled) between a high-side potential and a low-side potential. The driver stage comprises a high-side switch, in particular a p-type FET transistor, arranged between the high-side potential and the output node, a low-side switch, in particular a n-type FET transistor, arranged between the output node and the low-side potential, and an intermediate circuit arranged between the output node and an intermediate potential, wherein the intermediate potential lies between the high-side potential and the low-side potential.

Furthermore, the driver stage comprises a control unit configured to operate the driver stage at least in a high-side phase, in a low-side phase and in an intermediate phase. The operation in the different phases may be performed in a mutually exclusive manner. An operation cycle may comprise the high-side phase, the low-side phase and one or more (notably two) intermediate phases. The operation cycle may be repeated, e.g., at a certain operation cycle rate.

In the high-side phase, the high-side switch is closed, the intermediate circuit is open and the low-side switch is open, such that the output node is connected to the high-side potential. In the low-side phase, the low-side switch is closed, the intermediate circuit is open and the high-side switch is open, such that the output node is connected to the low-side potential. Furthermore, in the intermediate phase for transiting from the high-side phase to the low-side phase or for transiting from the low-side phase to the high-side phase, the intermediate circuit is closed, the low-side switch is open and the high-side switch is open, such that the output node is connected to the intermediate potential.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple" or "coupled" refers to elements being in electrical communication with each other, whether directly connected e.g., via wires, or in some other manner

SHORT DESCRIPTION OF THE FIGURES

The invention is explained below in an exemplary manner with reference to the accompanying drawings, wherein

FIG. 2b shows different phases of the driver stage of FIG. 2a;

FIG. 2c shows an example output voltage of the driver stage of FIG. 2a;

DETAILED DESCRIPTION

Figure 1A:
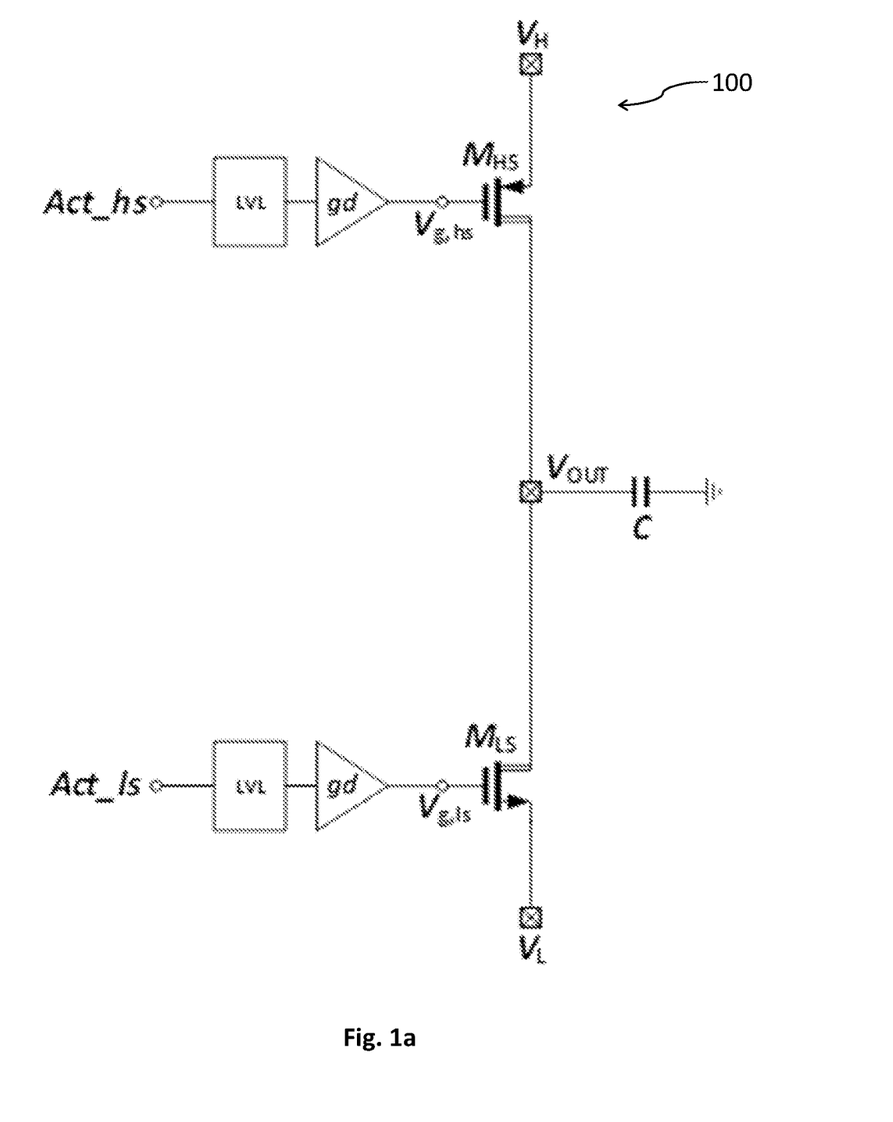
FIG. 1a shows an example driver stage.

As indicated above, the present document is directed at increasing the power efficiency of a driver stage. FIG. 1 shows an output driver configuration (i.e., a driver stage) 100 comprising a low-side switch $M_{LS}$ and a high-side switch $M_{HS}$. The output node $V_{OUT}$ can be either connected to the higher supply voltage, i.e., the high-side potential, (denoted as $V_H$) through the high-side switch Mus or to the lower supply voltage, i.e., the low-side potential, (denoted as $V_L$) through the low-side switch $M_{LS}$. The type of loading at the output node $V_{OUT}$ may include but is not limited to.

- capacitive loading (such as the gate of a MOSFET);
- inductive loading (as in the case of a DC/DC converter); and/or
- resistive loading (e.g., sourcing and/or sinking of a constant current).

The driver stage 100 may in particular comprise a low-side power FET $M_N$ and a high-side power FET $M_P$. The power FETs may be controlled via gate drivers (denoted as 'gd'). The low-side gate driver operates at a supply domain referred to $V_L$. The high-side gate driver operates at a supply domain referred to $V_H$. Control signal level conversion to the corresponding supply domain may be performed by respective level shifters 'LVL'.

The low- and high-side voltages may take on the following levels:

- $V_H = 2V$ to $10V$; and/or
- $V_L = -5V$ to $-18V$.

In a more generic scenario, the following voltage levels may apply
- $V_H > V_{DD}$ (wherein $V_{DD}$ is the nominal supply voltage of the system 100)
- $V_L < V_{SS}$ (wherein $V_{SS}$ is the nominal ground level of the system 100).

Figure 1B:
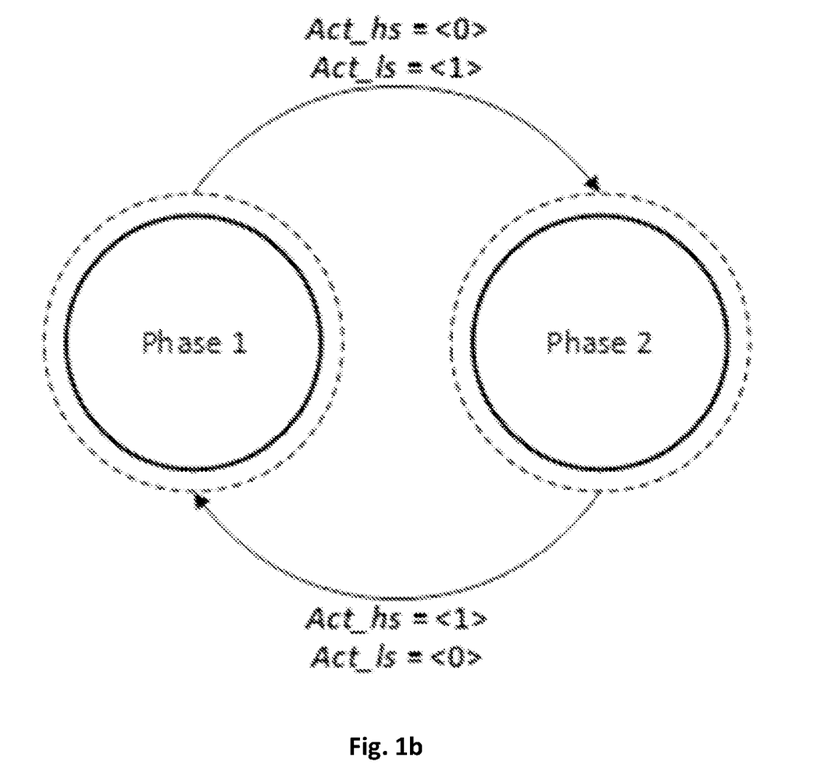
FIG. 1b shows an example phase diagram of a driver stage.

It may be assumed that the output voltage $V_{OUT}$ can be either connected to the higher supply level $V_H$ or to the lower supply level $V_L$. No additional state may be allowed, which makes the control signals Act_ls 112 and Act_hs 111 complementary to one another from the logic standpoint. A simplified state diagram is shown in FIG. 1b. When the control signals Act_hs=<1> & Act_ls=<0>, the system 100 is in Phase 1 (i.e., the high-side phase) and the output is connected to the higher supply level $V_H$. On the other hand, when the control signals Act_ls=<1> & Act_hs=<0>, the system 100 is in Phase 2 (i.e., the low-side phase) and the output is connected to the lower supply level $V_L$.

Figure 1C:
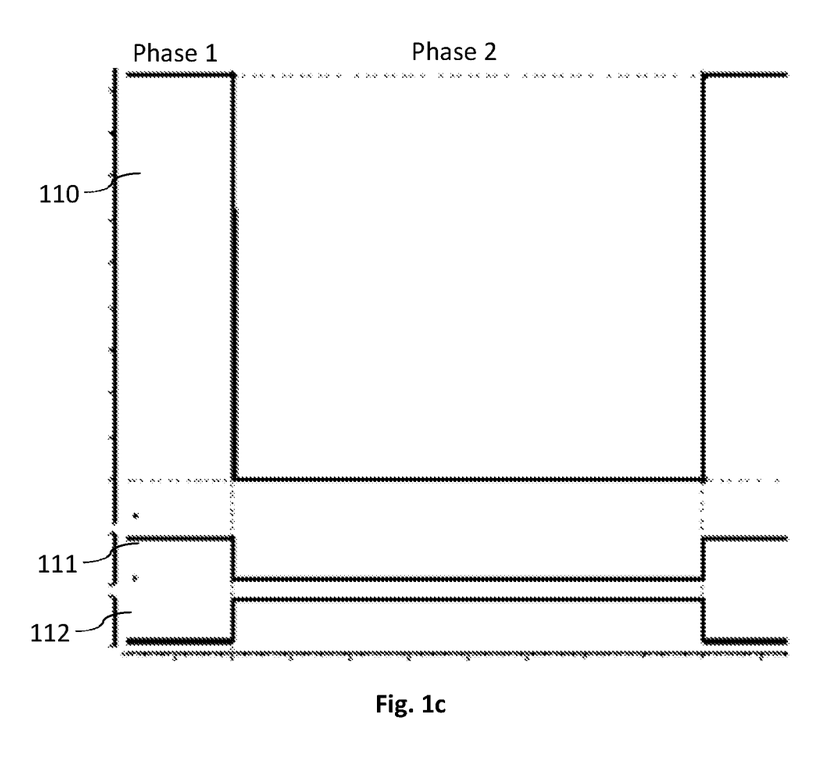
FIG. 1c shows an example output voltage at an output node of a driver stage.

When the control logic level is changing, the output voltage is transitioning from $V_H$ to $V_L$ or vice versa. A sample waveform of the output voltage transitioning is shown in FIG. 1c. The output voltage 110 starts in Phase 1, where it may be held at an example voltage of $V_H$=10V. When Act_hs goes low and Act_ls goes high, the output voltage 110 is pulled down to an example voltage of $V_L$=−18V. The state is changed from Phase 1 to Phase 2. The overall output voltage swing for this example is $\Delta V_{OUT} = V_H - V_L = 10V - (-18V) = 28V$.

The switching losses associated with changing the output voltage level have the following proportionality:

$$P_{sw} \propto C, f_{sw}, \Delta V^2$$

wherein
C is the total output capacitance;
$f_{sw}$ is the switching frequency; and
$\Delta V$ is the output voltage swing.

Hence, there is a quadratic dependency on the output voltage swing. Consequently, the switching losses can be reduced by limiting the output voltage swing. This may be achieved by performing the output voltage transitioning in two or more steps. For this purpose, an intermediate voltage level (i.e., an intermediate potential) is introduced into the driver stage 100, as illustrated in FIG. 2a.

Figure 2A:
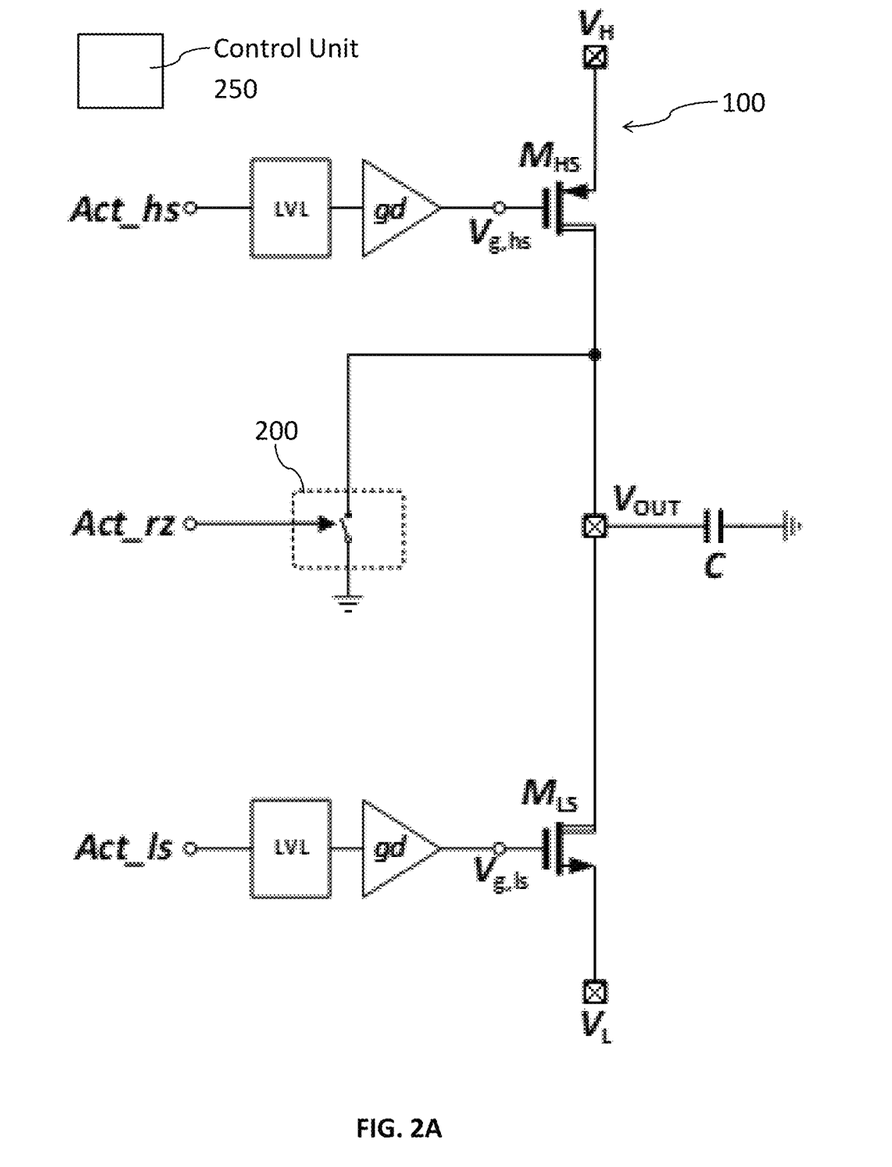
FIG. 2a shows an example driver stage with a return-to-zero (RZ) circuit.
Figure 2B:
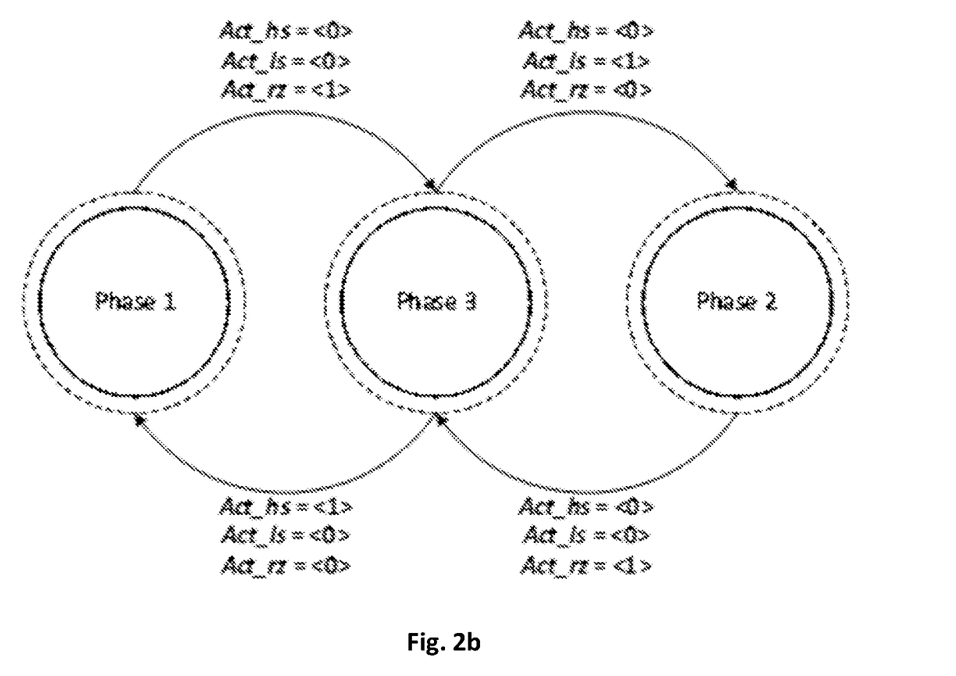

The driver stage 100 of FIG. 2a comprises an additional circuit 200 connecting the output node $V_{OUT}$ to ground (or in more general terms to an intermediate potential). The circuit 200 is controlled with an additional control signal Act_rz, wherein 'rz' denotes return-to-zero. The additional circuit 200 of FIG. 2a allows three output voltage levels: $V_H$, $V_L$ and $V_{SS}$ (wherein $V_{SS}$ is the intermediate potential). When transitioning from one supply level to the other supply level, the output is first connected to the intermediate potential. The adjusted state diagram is shown in FIG. 2b:

With the control signals Act_hs=<1> & Act_ls=<0> & Act_rz=<0>, the system 100 is in Phase 1 and the output is connected to the higher supply level $V_H$;
With the control signals Act_ls=<1> & Act_hs=<0> & Act_rz=<0>, the system 100 is in Phase 2 and the output is connected to the lower supply level $V_L$;
With the control signals Act_hs=<0> & Act_ls=<0> & Act_rz=<1>, the system 100 is in Phase 3 (i.e., the intermediate phase) and the output is connected to the intermediate (or reference) voltage $V_{SS}$ 210.

Figure 2C:
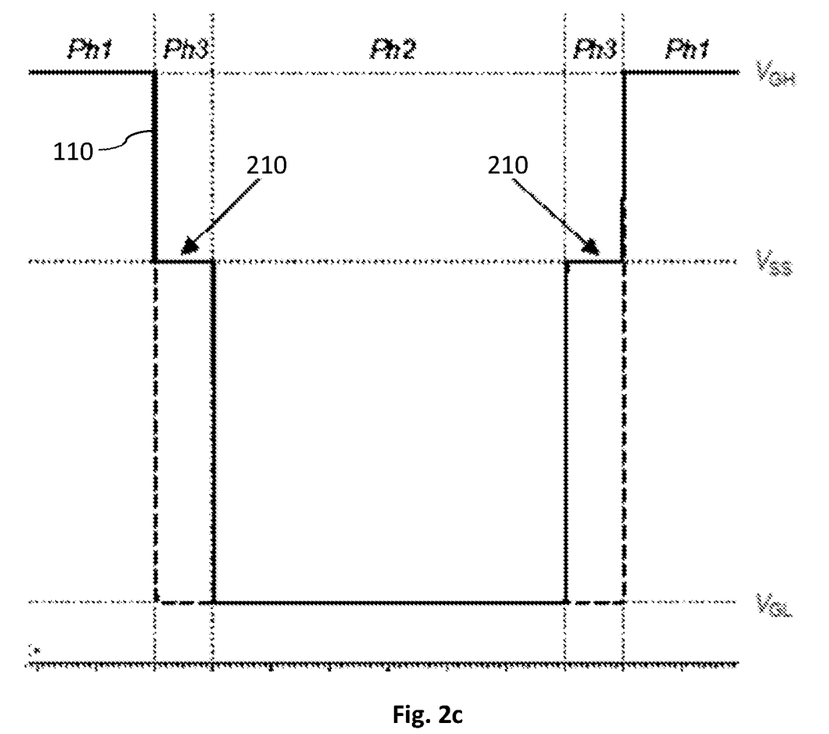

The output voltage transitioning waveforms are shown in FIG. 2c. There is an intermediate phase (Ph3) between phase 1 (Ph1) and phase 2 (Ph2). The time that the output voltage spends in phase 3 may be application-specific and can be adjusted accordingly. Preferably, the time spent in the intermediate phase is shorter than the time spent in phase 1 or phase 2, as the latter phases are the main phases.

Considering the specific numerical example where the higher supply voltage is $V_H$=10V and the lower supply voltage is $V_L$=−18V, the switching losses for the 2-phase switching scheme of FIG. 1a depend on the entire output voltage swing, i.e., 10V/−18V, and may be denoted as: $P_{sw,2phase} = P_{sw,10V/-18V}$.

On the other hand, the switching losses of the 3-phase switching scheme of FIG. 2a are the sum of two contributors: a first voltage swing from the higher supply voltage $V_H$=10V to the intermediate node $V_{SS}$ and a second voltage switch from the intermediate node $V_{SS}$ to the lower supply voltage $V_L$=−18V. This results in the following switching losses for the 3-phase switching scheme: $P_{sw,3phase} = P_{sw,10V,0V} + P_{sw,0V/-18V}$.

Assuming that the switching frequency and the output capacitance are kept constant, the switching loss ratio may be written as follows: $P_{sw,ratio} = P_{sw,2phase}/P_{sw,3phase} = ((10V-(-18V))^2)/((10V-0V)^2 + (0V-(-18V))^2) = 784/424 = 1.85$.

Hence, the switching losses may be reduced by a factor 1.85 in the given example.

Figure 3:
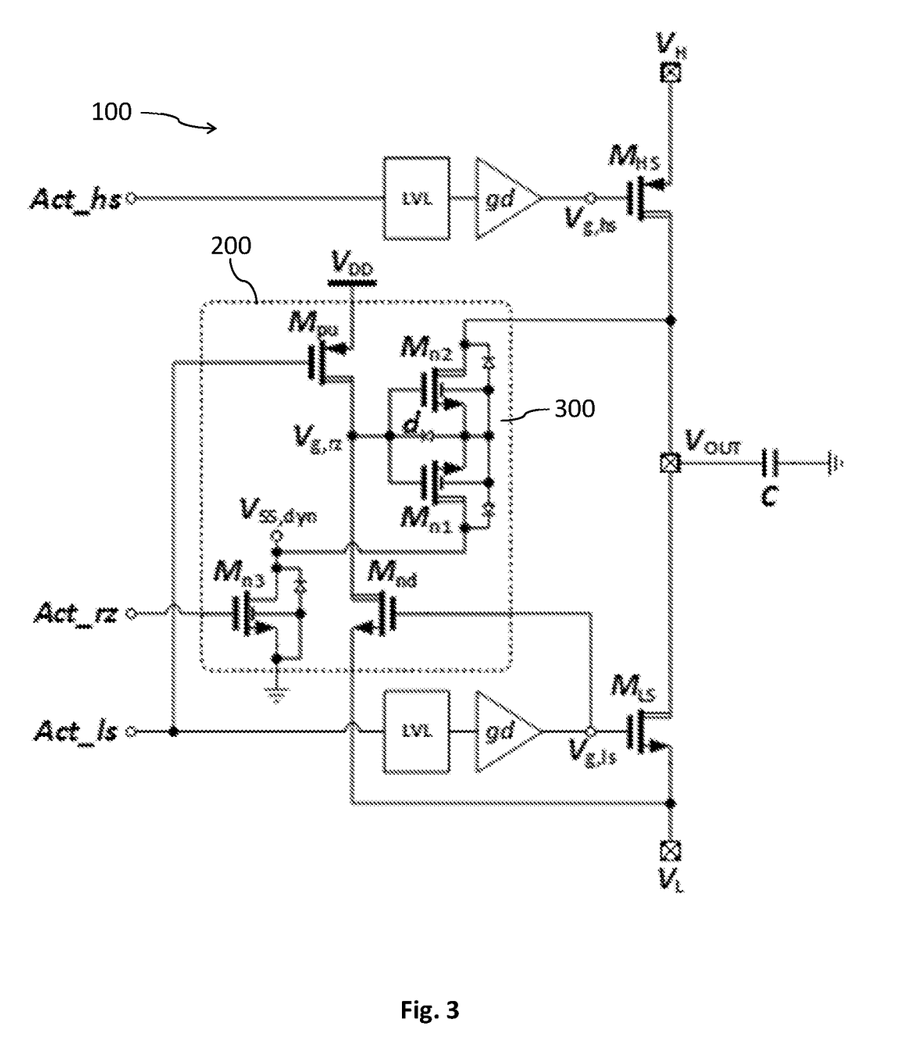
FIG. 3 shows an example RZ circuit for a driver stage.
Figure 4:
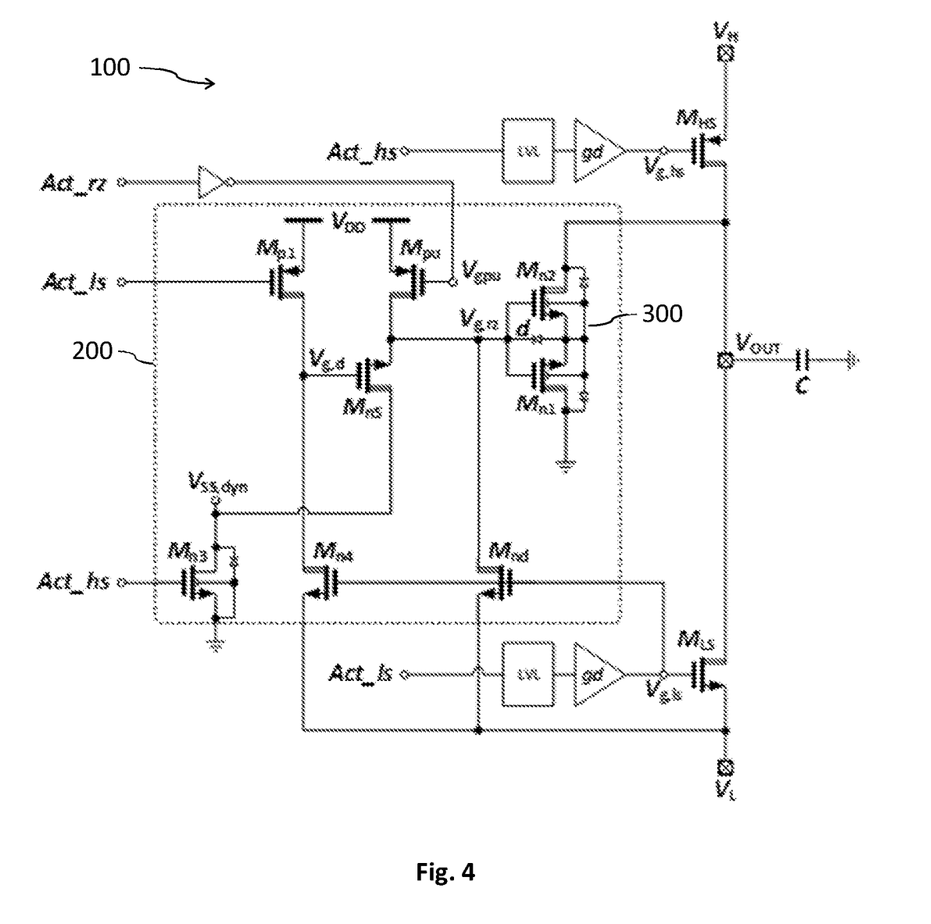
FIG. 4 shows another RZ circuit for a driver stage.

FIGS. 3 and 4 show example RZ circuits 200 for a driver stage 100, wherein an RZ circuit 200 allows the output voltage to be coupled to the intermediate voltage level (i.e., to the intermediate potential) in an efficient and reliable manner. The RZ circuits 200 may be referred to in general terms as "intermediate circuits".

The RZ circuits 200 described herein are configured to connect the output voltage or the output node $V_{OUT}$ to the intermediate (e.g., ground) potential $V_{SS}$ and to ensure that the RZ circuit 200 is kept off, while the output voltage is at the $V_H$ and/or $V_L$ level. This means that in case a PMOS type switch is used within the circuit 200, the gate potential of the switch is able to follow the output voltage $V_{OUT}$ up to the higher supply potential $V_H$ and to prevent the channel of the switch from turning on. A back-to-back device may be used to prevent the body-diode from turning on; and/or in case an NMOS type switch is used within the circuit 200, the gate potential of the switch is able to follow the output voltage $V_{OUT}$ down to the lower supply potential $V_L$ and to prevent the channel of the switch from turning on. A back-to-back device configuration may be used to prevent the body-diode from turning on.

In the present document, a NMOS type device is used within the circuit 200, because of the higher carrier mobility and a relatively straightforward turn-on mechanism with respect to the intermediate potential $V_{SS}$. As a result of this, an area-efficient RZ circuit 200 may be provided.

The RZ circuit 200 of FIG. 3 comprises a back-to-back NMOS type main device 300 for connecting the output voltage $V_{OUT}$ to the intermediate potential $V_{SS}$, wherein the main device 200 is denoted as $M_{n1}/M_{n2}$. Furthermore, the RZ circuit 200 comprises an auxiliary isolation device $M_{n3}$ in series with the afore-mentioned main device $M_{n1}/M_{n2}$, which results in an overall number of transistors within the electrical path from the output voltage $V_{OUT}$ to the intermediate node $V_{SS}$ of three.

During the low-side phase (i.e., phase 2), the gate terminal of $M_{n1}/M_{n2}$ is connected to the lower supply voltage $V_L$, thereby ensuring that no conduction is taking place. An additional NMOS device $M_{nd}$ is used for this purpose to ensure that the gate potential of $M_{n1}/M_{n2}$ is able to follow the output voltage $V_{OUT}$ all the way down to the lower supply voltage $V_L$, thereby preventing the channel of $M_{n1}/M_{n2}$ to turn on. The pull-down device $M_{nd}$ turns on simultaneously with the low-side switch $M_{LS}$. This is achieved by tying the gate terminals of both transistors $M_{nd}$ and $M_{LS}$ together. Both devices $M_{nd}$ and $M_{LS}$ may be chosen to be of the same type, in order to further improve the matching behavior (voltage rating, structure, etc.).

When the output voltage is connected to the higher supply voltage $V_H$ during the high-side phase (i.e., phase 1), the high-side device $M_{HS}$ is turned on, while the low-side device $M_{LS}$ and the main device $M_{n1}/M_{n2}$ is kept off. Turning off the low-side device $M_{LS}$ leads to the pull-down transistor $M_{nd}$ to be tuned off as well. As a result of this, the low-resistive path from the gate terminal $V_{g,rz}$ of $M_{n1}/M_{n2}$ to the lower supply voltage $V_L$ no longer exists. To prevent the gate terminal $V_{g,rz}$ of $M_{n1}/M_{n2}$ from floating, the gate terminal $V_{g,rz}$ may be connected to the nominal supply voltage $V_{DD}$ by the PMOS pull-up device $M_{pu}$. The gate terminal $V_{g,rz}$ of $M_{n1}/M_{n2}$ may be kept at the nominal supply level $V_{DD}$ during the (entire) high-side phase. To prevent the main device $M_{n1}/M_{n2}$ from conducting, a dynamic ground switching may be introduced, thereby providing a low-resistive ground connection to the main device $M_{n1}/M_{n2}$ selectively (only) during the intermediate phase, when the output voltage $V_{OUT}$ is connected to $V_{SS}$. This may be achieved by providing an additional device $M_{n3}$. The gate terminal of the device $M_{n3}$ is controlled by the logic control signal Act_rz. In the low-side phase and in the high-side phase, when the Act_rz signal is low, the transistor $M_{n3}$ is turned off and the dynamic ground node $V_{SS,dyn}$ is left in a high-impedance state.

When the output voltage is connected to the intermediate node or intermediate potential $V_{SS}$ during the return-to-zero (i.e., intermediate) phase (following the low-side or the high-side phase), the back-to-back switch device $M_{n1}/M_{n2}$ and the additional device $M_{n3}$ are turned on. The pull-up switch $M_{pu}$ pulls the node $V_{g,rz}$ to the nominal supply voltage $V_{DD}$, thereby activating the device $M_{n1}/M_{n2}$ while the additional device $M_{n3}$ connects the dynamic ground node $V_{SS,dyn}$ to the nominal ground potential $V_{SS}$ (i.e., to the intermediate potential). The pull-up switch $M_{pu}$ is controlled by the logic control signal Act_ls. A low-ohmic path from $V_{OUT}$ to $V_{SS}$ is established through the devices $M_{n1}/M_{n2}$ and $M_{n3}$.

The RZ circuit 200 of FIG. 3 comprises the following components:
- a main switching device $M_{n1}/M_{n2}$ which may be of a (high-voltage) NMOS type. The first main transistor $M_{n1}$ may be configured to withstand a drain-source voltage difference of $V_L$. The second main transistor $M_{n2}$ may be configured to withstand a drain-source voltage difference of $V_H$. The switching devices $M_{n1}$ and $M_{n2}$ are operated as a back-to-back connected switching device $M_{n1}/M_{n2}$. The gate terminal receives the input signal $V_{g,rz}$ and the source terminals are connected together. The drain terminal of $M_{n1}$ is connected to the local ground node $V_{SS,dyn}$ while the drain terminal of $M_{n2}$ is connected to the output voltage $V_{OUT}$.
- a control device $M_{n3}$ which may be of a (regular) NMOS type. The gate-source and drain-source voltages may go as high as $V_{DD}$. The device $M_{n3}$ has its gate driven by the control signal Act_rz. The drain terminal is providing the local ground node $V_{SS,dyn}$. The source terminal is connected to the ground potential $V_{SS}$ (i.e., to the intermediate potential).
- a pull-up device $M_{pu}$ which may be of a (high-voltage) PMOS type. The device $M_{pu}$ may be configured to withstand a drain-source voltage difference of ($V_{DD}$−$V_L$). The gate terminal may be driven by the control signal Act_ls. The source terminal may be connected to the nominal supply potential $V_{DD}$ while the drain terminal is driving the node $V_{g,rz}$.
- a pull-down device $M_{nd}$ which may be of a (high-voltage) NMOS type. The device $M_{nd}$ may be configured to withstand a drain-source voltage difference of ($V_{DD}$−$V_L$). The gate terminal may be driven together with the gate terminal $V_{g,ls}$ of the low-side switch. The source terminal may be connected to the lower supply potential $V_L$ while the drain terminal is driving the node $V_{g,rz}$.
- a clamping diode d, which ensures that the common-source node of the main device $M_{n1}/M_{n2}$ has a discharge path, when the node $V_{g,rz}$ is pulled towards $V_L$. The clamping diode d may be connected between the common source of the main device $M_{n1}/M_{n2}$ and the gate terminal of the main device $M_{n1}/M_{n2}$ denoted as $V_{g,rz}$.

The High-to-Low output voltage transition may be performed in a sequential manner:
1. The first transition starts with the control signal Act_hs going low and the control signal Act_rz going high. This indicates that the output voltage should transition from the high supply voltage $V_H$ to the intermediate (e.g., zero) potential. The switch $M_{n3}$ is turned on, thereby providing a low-impedance ground path to the node $V_{SS,dyn}$. The gate level of the back-to-back connected switch device $M_{n1}/M_{n2}$ remains unchanged and is kept at the supply potential $V_{DD}$. Now there is a low-resistive path to the intermediate potential $V_{SS}$ through the switch $M_{n3}$ and the back-to-back switch device $M_{n1}/M_{n2}$ such that the output voltage $V_{OUT}$ is pulled down to the $V_{SS}$ level.
2. The second transition starts with the control signal Act_rz going low and the control signal Act_ls going high. This indicates that the output voltage should transition from the intermediate potential $V_{SS}$ to the lower supply voltage $V_L$. The switch $M_{n3}$ is turned off leaving the node $V_{SS,dyn}$ in a high impedance state. The (high-voltage) NMOS device $M_{nd}$ turns on simultaneously with the low-side switch $M_{LS}$ and connects the node $V_{g,rz}$ to the lower supply level $V_L$, thereby ensuring that the back-to-back connected switch device $M_{n1}/M_{n2}$ remains turned off in a reliably manner. The output voltage $V_{OUT}$ is pulled down to the $V_L$ level.

Furthermore, the Low-to-High output voltage transition may be performed in a sequential manner:
1. The first transition starts with the control signal Act_ls going low and the control signal Act_rz going high. This indicates that the output voltage which has been kept at the low supply voltage $V_L$ should now be returned to the intermediate potential. The switch $M_{n3}$ is turned on providing a low-impedance ground path to the node $V_{SS,dyn}$. The high-voltage PMOS device $M_{pu}$ turns on to pull up the gate terminal of the back-to-back connected switch device $M_{n1}/M_{n2}$ to the supply potential $V_{DD}$. Now there is a low-resistive path to the intermediate potential through the switch $M_{n3}$ and the back-to-back switch device $M_{n1}/M_{n2}$ such that the output voltage $V_{OUT}$ is pulled up to $V_{SS}$ level.
2. The second transition starts with the control signal Act_rz going low and the control signal Act_hs going high. This indicates that the output voltage which has been kept at the ground potential $V_{SS}$ should now be pulled up to the higher supply voltage $V_H$. The switch $M_{n3}$ is turned off leaving the node $V_{SS,dyn}$ in a high impedance state. The gate level of the back-to-back connected switch device $M_{n1}/M_{n2}$ remains unchanged and is kept at the nominal supply potential $V_{DD}$. The high-side switch $M_{HS}$ is turned on resulting in the output voltage $V_{OUT}$ to be pulled up to the $V_H$ level.

FIG. 4 shows a further example of an RZ circuit 200 (i.e., of an intermediate circuit). The main back-to-back NMOS type switch device 300 for connecting the output voltage $V_{OUT}$ to the intermediate potential $V_{SS}$ is denoted as $M_{n1}/M_{n2}$. The RZ circuit 200 does not comprise an auxiliary isolation device $M_{n3}$ in series to the main device $M_{n1}/M_{n2}$, which results in an overall number of transistors in the electrical path from the output voltage $V_{OUT}$ to the intermediate node $V_{SS}$ of two.

The gate of $M_{n1}/M_{n2}$ is connected to the lower supply voltage $V_L$ during the low-side phase, thereby ensuring that no conduction is taking place. An additional NMOS device $M_{nd}$ may be used for that purpose to ensure that the gate potential of $M_{n1}/M_{n2}$ can follow the output voltage $V_{OUT}$ all the way down to the lower supply voltage $V_L$ to prevent the channel of $M_{n1}/M_{n2}$ from turning on. The pull-down devices $M_{n4}$ and $M_{nd}$ turn on simultaneously with the low-side switch $M_{LS}$. This may be achieved by tying the gate terminals of the transistors $M_{n4}$, $M_{nd}$ and $M_{LS}$ together. All the devices can be chosen to be of the same type to improve the matching of their behavior (voltage rating, structure, etc.).

When the output voltage is connected to the higher supply voltage $V_H$ during the high-side phase, the high-side device $M_{HS}$ is turned on while the low-side device $M_{LS}$ as well as the return-to-zero main device $M_{n1}/M_{n2}$ are kept off. Turning off the low-side device $M_{LS}$ simultaneously turns off the pull-down transistor $M_{nd}$ such that the low-resistive path from the node $V_{g,rz}$ to the lower supply voltage $V_L$ no longer exists. To prevent the gate terminal of the main device $M_{n1}/M_{n2}$ from floating, it is connected to the nominal ground $V_{SS}$ (i.e., to the intermediate potential) using an additional circuitry comprising the devices $M_{p1}$, $M_{n3}$ and $M_{n5}$. The nominal ground is a preferred potential for the gate terminal $V_{g,rz}$ during the high-side phase (compared to the nominal supply level $V_{DD}$). The switch $M_{p1}$ is active, because it is controlled by the logic control signal Act_ls which is low in the high-side phase. The gate terminal $V_{g,d}$ of switch $M_{n5}$ is therefore connected to the nominal supply level $V_{DD}$ by the device $M_{p1}$, which ensures that the switch $M_{n5}$ is active. Finally, device $M_{n3}$ is directly controlled by the logic control signal Act_hs which takes on the high level for the high-side phase. The gate terminal $V_{g,rz}$ is therefore connected to the nominal ground $V_{SS}$ via the low-resistive path provided by devices $M_{n3}$ and $M_{n5}$ during the high-side phase.

When the output voltage is to be connected to the intermediate node $V_{SS}$ following either the low-side or the high-side phase, the back-to-back switch device $M_{n1}/M_{n2}$ is turned on. The pull-up switch $M_{pu}$ pulls the node $V_{g,rz}$ to the nominal supply voltage $V_{DD}$, thereby activating the device $M_{n1}/M_{n2}$. The pull-up switch $M_{pu}$ is controlled by the inverted logic control signal Act_rz. A low-ohmic path from $V_{OUT}$ to $V_{SS}$ is established through the main device $M_{n1}/M_{n2}$.

Individual components of the RZ circuit 200 are as follows:
- the main device $M_{n1}/M_{n2}$ 300, which may be of a (high-voltage) NMOS type. The first main transistor $M_{n1}$ may be configured to withstand a drain-source voltage difference of $V_L$, and the second main transistor $M_{n2}$ may be configured to withstand a drain-source voltage difference of $V_H$. These devices are operated as a back-to-back connected switch. The gate terminal receives input signal $V_{g,rz}$, the source terminals are connected together. The drain terminal of $M_{n1}$ is connected (directly) to the ground node $V_{SS}$ while the drain terminal of $M_{n2}$ is connected (directly) to the output voltage $V_{OUT}$.
- the device $M_{n3}$ which may be of a (regular) NMOS type. The gate-source and drain-source voltages may go as high as $V_{DD}$. The device has its gate driven by the control signal Act_hs. The drain terminal is providing the local ground node $V_{SS,dyn}$. The source terminal is connected to the ground potential $V_{SS}$.
- the device $M_{pu}$ which may be of a (high-voltage) PMOS type. The device may be configured to withstand a drain-source voltage difference of $(V_{DD}-V_L)$. The gate terminal is driven by the inverted control signal Act_rz. The source terminal is connected to the supply potential $V_{DD}$ while the drain terminal is driving the node $V_{g,rz}$.
- the device $M_{nd}$ which may be of a (high-voltage) NMOS type. The device may be configured to withstand a drain-source voltage difference of $(V_{DD}-V_L)$. The gate terminal is driven together with the gate terminal of the low-side switch $V_{g,ls}$. The source terminal is (directly) connected to the lower supply potential $V_L$ while the drain terminal is driving the node $V_{g,rz}$.
- the device $M_{n4}$ which may be of a (high-voltage) NMOS type. The device may be configured to withstand a drain-source voltage difference of $(V_{DD}-V_L)$. The gate terminal is driven together with the gate terminal of the low-side switch $V_{g,ls}$. The source terminal is (directly) connected to the lower supply potential $V_L$ while the drain terminal is driving the node $V_{g,d}$.
- the device $M_{n5}$ which may be of a (high-voltage) NMOS type. The device may be configured to withstand a drain-source voltage difference of $(V_{SS}-V_L)$. The gate terminal receives input signal $V_{g,d}$, the source terminal is (directly) connected to the node $V_{g,rz}$ and the drain terminal is (directly) connected to the local ground node $V_{SS,dyn}$.
- the device $M_{p1}$ which may be of a (high-voltage) PMOS type. The device may be configured to withstand a drain-source voltage difference of $(V_{DD}-V_L)$. The gate terminal is driven by the control signal Act_ls. The source terminal is (directly) connected to the supply potential $V_{DD}$ and the drain terminal is driving the node $V_{g,d}$; and/or
- the clamping diode d which may ensure that the common-source node of $M_{n1}/M_{n2}$ has a discharge path as the node $V_{g,rz}$ is pulled towards $V_L$. It is connected between the common source of $M_{n1}/M_{n2}$ devices and the gate terminal of $M_{n1}/M_{n2}$ denoted as $V_{g,rz}$.

The High-to-Low output voltage transition may be performed in a sequential manner:
1. The first transition starts with the control signal Act_hs going low and the control signal Act_rz going high. This indicates that the output voltage should transition from the high supply voltage $V_H$ to the intermediate (possibly zero) potential. The device $M_{n3}$ is turned off and the dynamic ground node $V_{SS,dyn}$ is left in a high-impedance state. The switch $M_{pu}$ is turned on to connect the gate node $V_{g,rz}$ to the supply potential $V_{DD}$, thereby activating a low-resistive path to the $V_{SS}$ level through the back-to-back switch device $M_{n1}/M_{n2}$ such that the output voltage $V_{OUT}$ is pulled down to $V_{SS}$ level.
2. The second transition starts with the control signal Act_rz going low and the control signal Act_ls going high. This indicates that the output voltage should transition from the ground potential $V_{SS}$ to the lower supply voltage $V_L$. The switch $M_{n3}$ is turned on, thereby connecting the node $V_{SS,dyn}$ to the $V_{SS}$ level. The high-voltage NMOS device $M_{nd}$ turns on simultaneously with the low-side switch $M_{LS}$ and connects the node $V_{g,rz}$ to the lower supply level $V_L$, thereby ensuring that the back-to-back connected switch device $M_{n1}/M_{n2}$ remains reliably turned off. The output voltage $V_{OUT}$ is pulled down to the $V_L$ level.

The Low-to-High output voltage transition may be performed in a sequential manner:

1. The first transition starts with the control signal Act_ls going low and the control signal Act_rz going high. This indicates that the output voltage which has been kept at the low supply voltage $V_L$ should be returned to the intermediate potential. The device $M_{n3}$ is turned off and the dynamic ground node $V_{SS,dyn}$ is left in a high-impedance state. The high-voltage PMOS device $M_{pu}$ turns on to pull up the gate terminal of the back-to-back connected switch device $M_{n1}/M_{n2}$ to the supply potential $V_{DD}$. As a result of this, there is a low-resistive path to the $V_{SS}$ level through the back-to-back switch device $M_{n1}/M_{n2}$ such that the output voltage $V_{OUT}$ is pulled up to $V_{SS}$ level.
2. The second transition starts with the control signal Act_rz going low and the control signal Act_hs going high. This indicates that the output voltage which has been kept at the potential $V_{SS}$ should be pulled up to the higher supply voltage $V_H$. The switch $M_{n3}$ is turned on, thereby connecting the node $V_{SS,dyn}$ to the $V_{SS}$ level. The high-voltage PMOS device $M_{p1}$ is on, thereby ensuring that the high-voltage NMOS transistor $M_{n5}$ is active. As a result of this, there is a low-resistive path from the gate node $V_{g,rz}$ to the $V_{SS}$ level through devices $M_{n3}$ and $M_{n5}$. The back-to-back connected switch device $M_{n1}/M_{n2}$ is kept turned off. The high-side switch $M_{HS}$ is turned on, resulting in the output voltage $V_{OUT}$ to be pulled up to the $V_H$ level.

The RZ circuit 200 of FIG. 4 only comprises two transistors within the main electrical path between the intermediate node that the output node, thereby reducing the area requirements (in case of relatively high currents) and/or thereby increasing the power efficiency of the driver stage 100.

The RZ circuits 200 have several benefits:

- Static current consumption—the proposed RZ circuit 200 does not consume any static biasing current;
- Turn-off option—if the additional Phase 3 is not needed, the proposed RZ circuit 200 can be turned off by keeping the Act_rz signal low;
- Capacitive loading—the rise/fall time of the output voltage is typically a critical parameter for the driver stage 100, and it can be shown that the slope of the output voltage is not affected by the RZ circuit 200.
- The proposed RZ circuit 200 introduces an additional output driver state which provides a low-impedance ground connection to the output node;
- The proposed RZ circuit 200 allows to significantly reduce switching losses by limiting the output voltage swing during transitioning;
- The proposed RZ circuit 200 can also serve as a pull-down circuit in a deactivated state, thereby ensuring a well-defined ground level at the output of the driver stage 100;
- The additional output driver state providing a low-impedance ground connection to the output which can be used in a test-mode for enabling a high-voltage stress test of both pass-devices $M_{HS}$ and $M_{LS}$.
- The additional output driver state providing a low-impedance ground connection to the output can be used for a non-overlap control while switching between both pass-devices $M_{HS}$ and $M_{LS}$.

Hence, a driver stage 100 configured to switch an output node $V_{OUT}$ between a high-side potential $V_H$ and a low-side potential $V_L$ is described. The driver stage 100 may be referred to as a driver unit or a driver circuit or a driver arrangement. The high-side potential $V_H$ and the low-side potential $V_L$ may have an opposite polarity with regards to one another. By way of example, the high-side potential $V_H$ may be positive and the low-side potential $V_L$ may be negative.

The driver stage 100 comprises a high-side switch $M_{HS}$, in particular a p-type FET (field effect transistor) transistor, which is arranged between the high-side potential $V_H$ and the output node $V_{OUT}$. In particular, the source terminal of the high-side switch $M_{HS}$ may be (directly) coupled to the high-side potential $V_H$ and the drain terminal of the high-side switch $M_{HS}$ may be (directly) coupled to the output node $V_{OUT}$. The gate terminal of the high-side switch $M_{HS}$ may be coupled to a high-side control signal Act_hs (via a gate driver gd).

Furthermore, the driver stage 100 comprises a low-side switch $M_{LS}$, in particular a n-type FET transistor, which is arranged between the output node $V_{OUT}$ and the low-side potential $V_L$. In particular, the source terminal of the low-side switch $M_{LS}$ may be (directly) coupled to the low-side potential $V_L$ and the drain terminal of the low-side switch $M_{LS}$ may be (directly) coupled to the output node $V_{OUT}$. The gate terminal of the low-side switch $M_{LS}$ may be coupled to a low-side control signal Act_ls (via a gate driver gd).

The driver stage 100 further comprises an intermediate circuit 200 which is arranged between the output node $V_{OUT}$ and an intermediate potential $V_{SS}$, wherein the intermediate potential lies between the high-side potential $V_H$ and the low-side potential $V_L$. The intermediate potential may be zero and/or ground.

In addition, the driver stage 100 comprises a control unit 250 which is configured to operate the driver stage 100 at least in a high-side phase, in a low-side phase and in an intermediate phase. The driver stage 100 may be operated in the different phases in a mutually exclusive manner (i.e., in one particular phase at a time).

In the high-side phase, the high-side switch $M_{HS}$ is closed (thereby coupling the output node with the high-side potential), the intermediate circuit 200 is open (thereby decoupling the output node from the intermediate potential) and the low-side switch $M_{LS}$ is open (thereby decoupling the output node from the low-side potential), such that the output node $V_{OUT}$ is connected to the high-side potential $V_H$ (and such that the output voltage corresponds to the high-side potential).

In the low-side phase, the low-side switch $M_{LS}$ is closed (thereby coupling the output node with the low-side potential), the intermediate circuit 200 is open (thereby decoupling the output node from the intermediate potential) and the high-side switch $M_{HS}$ is open (thereby decoupling the output node from the high-side potential), such that the output node $V_{OUT}$ is connected to the low-side potential $V_L$ (and such that the output voltage corresponds to the low-side potential).

In the intermediate phase for transiting from the high-side phase to the low-side phase or for transiting from the low-side phase to the high-side phase, the intermediate circuit 200 is closed (thereby coupling the output node with the intermediate potential), the low-side switch $M_{LS}$ is open (thereby decoupling the output node from the low-side potential) and the high-side switch $M_{HS}$ is open (thereby decoupling the output node from the high-side potential), such that the output node $V_{OUT}$ is connected to the intermediate potential (and such that the output voltage corresponds to the intermediate potential).

Hence, the control unit 250 may be configured to operate the driver stage 100 at any time either in the high-side phase, or in the low-side phase or in the intermediate phase, thereby allowing a particularly reliable and efficient operation of the driver stage 100.

An operation cycle of the driver stage 100 may have a total duration T. The operation cycle comprises a first section having a first (target) duration $T_1$, during which the driver stage 100 is operated in the high-side phase. Furthermore, the operation cycle comprises a second section having a second (target) duration $T_2$, during which the driver stage 100 is operated in the low-side phase. Subsequent to the first section (and prior to the second section of the same operation cycle), the operation cycle may comprise a first intermediate section having a first intermediate duration $T_{I,1}$, during which the driver stage 100 is operated in the intermediate phase. Furthermore, subsequent to the second section (and prior to the first section of the following operation cycle), the operation cycle may comprise a second intermediate section having a second intermediate duration $T_{I,2}$, during which the driver stage 100 is operated in the intermediate phase. The durations of the different sections of the operation cycle may be such that $T_1+T_{I,1}+T_2+T_{I,2}=T$. Typically, the first and/or second intermediate durations $T_{I,1}$, $T_{I,2}$ are substantially smaller (e.g., by a factor of 5 or more) than the first (target) duration $T_1$ and/or the second (target) duration $T_2$.

The control unit 250 may be configured to operate the driver stage 100 in a sequence of operation cycles.

The control unit may be configured to toggle the driver stage 100 between the high-side phase and the low-side phase in a repetitive manner (e.g., at a predetermined cycle rate, which may be 1/T). At each phase transition, an intermediate phase may be inserted, such that the individual phase transitions comprise a first partial transition from the high-side or low-side phase to the intermediate phase and a second partial transition from the intermediate phase to the low-side or high-side phase. As a result of this, the power consumption of the driver stage may be reduced.

The control unit 250 may be configured to maintain the driver stage 100 in the high-side phase or in the low-side phase for a target duration. Furthermore, the control unit 250 may be configured to maintain the driver stage 100 in the intermediate phase for transiting from the high-side phase to the low-side phase or for transiting from the low-side phase to the high-side phase for an intermediate duration. The intermediate duration may be smaller than 10% of the target duration. On the other hand, the intermediate duration may be greater than 0.1% of the target duration. As a result of this, a particularly power efficient operation of the driver stage 100 may be achieved.

The intermediate circuit 200 may comprise a main switching device $M_{n1}/M_{n2}$ which is configured to couple the output node $V_{OUT}$ to the intermediate potential, when the main switching device $M_{n1}/M_{n2}$ is closed, and to decouple the output node $V_{OUT}$ from the intermediate potential, when the main switching device $M_{n1}/M_{n2}$ is open. The main switching device $M_{n1}/M_{n2}$ may comprise (and/or may consist of) a first main transistor $M_{n1}$, in particular a n-type metal-oxide-semiconductor (MOS) transistor, and a second main transistor $M_{n2}$ in particular a n-type MOS transistor. The first main transistor $M_{n1}$ and the second main transistor $M_{n2}$ may be arranged in a back-to-back configuration. Furthermore, the main switching device $M_{n1}/M_{n2}$ may comprise a clamping diode d which is arranged between the common source terminals and the common gate terminals of the first and second main transistors $M_{n1}$, $M_{n2}$.

The intermediate circuit 200 may be configured to maintain the main switching device $M_{n1}/M_{n2}$ open during the (entire) low-side phase and during the (entire) high-side phase, thereby providing a particularly reliable operation of the driver stage 100.

The intermediate circuit 200 may be configured to generate an electrical path between the output node $V_{OUT}$ and the intermediate potential which only comprises the main switching device $M_{n1}/M_{n2}$ (i.e., only two transistors), or which only comprises the main switching device $M_{n1}/M_{n2}$ and a control device $M_{n3}$ (i.e., only three transistors). Hence, a particular power efficient driver circuit 100 may be provided.

The intermediate circuit 200 may comprise a pull-down device $M_{nd}$, in particular a n-type MOS transistor, which is arranged (directly) between the gate terminal $V_{g,rz}$ of the main switching device $M_{n1}/M_{n2}$ and the low-side potential $V_L$. The pull-down device $M_{nd}$ may be configured to connect the gate terminal $V_{g,rz}$ of the main switching device $M_{n1}/M_{n2}$ (directly) to the low-side potential $V_L$, when the driver stage 100 is operated in the low-side phase. The gate terminal of the pull-down device $M_{nd}$ may be (directly) coupled to the gate terminal $V_{g,ls}$ of the low-side switch $M_{LS}$. By providing a pull-down device $M_{nd}$, it may be ensured in a reliable manner that the intermediate circuit 200 is open during the low-side phase.

The intermediate circuit 200 may comprise a pull-up device $M_{pu}$, in particular a p-type MOS transistor, which is arranged (directly) between the gate terminal $V_{g,rz}$ of the main switching device $M_{n1}/M_{n2}$ and the nominal supply potential $V_{DD}$ (for the intermediate circuit 200, wherein the supply potential $V_{DD}$ may lie between the high-side potential and the intermediate potential). The pull-up device $M_{pu}$ may be configured to (directly) connect the gate terminal $V_{g,rz}$ of the main switching device $M_{n1}/M_{n2}$ to the supply potential $V_{DD}$, when putting the driver stage 100 in the intermediate phase. By providing a pull-up device $M_{pu}$, the driver circuit 100 may be put into the intermediate phase in a reliable manner.

The intermediate circuit 200 may comprise a control device $M_{n3}$, in particular an n-type MOS transistor, which is arranged (directly) between the drain terminal of the main switching device $M_{n1}/M_{n2}$ (notably the drain terminal of the first main transistor $M_{n1}$) and the intermediate potential (as illustrated in FIG. 3). The control unit 250 may be configured to close the control device $M_{n3}$, in particular using a control signal Act_rz for setting the intermediate phase, to close the control device $M_{n3}$ and to thereby put the driver stage 100 into the intermediate phase.

The gate terminal of the pull-up device $M_{pu}$ may be coupled to the low-side control signal Act_ls for controlling the low-side switch $M_{LS}$. As a result of this, a reliable operation of the driver stage 100 in the different phases may be achieved.

In an alternative example, the drain terminal of the main switching device $M_{n1}/M_{n2}$ may be directly coupled to the intermediate potential (as shown e.g., in FIG. 4). In this case, the gate terminal of the pull-up device $M_{pu}$ may be (directly) coupled to the inverted control signal Act_rz for controlling the intermediate circuit 200 to connect the output node $V_{OUT}$ with the intermediate potential. By coupling the drain terminal of the main switching device $M_{n1}/M_{n2}$ (notably the drain terminal of the first main transistor $M_{n1}$) directly with the intermediate potential, the power efficiency of the driver stage 100 may be improved.

The intermediate circuit 200 may comprise
- a fifth device $M_{n5}$, in particular a n-type MOS transistor, which is arranged (directly) between the gate terminal $V_{g,rz}$ of the main switching device $M_{n1}/M_{n2}$ and a dynamic ground node $V_{SS,dyn}$;
- a control device $M_{n3}$, in particular a n-type MOS transistor, which is (directly) arranged between the dynamic ground node $V_{SS,dyn}$ and the intermediate potential, wherein the control device $M_{n3}$ is controlled by the high-side control signal Act_hs for controlling the high-side switch $M_{HS}$;
- a first device $M_{p1}$, in particular a p-type MOS transistor, which is arranged (directly) between the supply potential $V_{DD}$ and the gate terminal $V_{g,d}$ of the fifth device $M_{n5}$; wherein the first device $M_{p1}$ is controlled by the low-side control signal Act_ls for controlling the low-side switch $M_{LS}$; and/or
- a fourth device $M_{n4}$, in particular a n-type MOS transistor, which is arranged (directly) between the gate terminal $V_{g,d}$ of the fifth device $M_{n5}$ and the low-side potential $V_L$; wherein the gate terminal of the fourth device $M_{n4}$ is (directly) coupled to the gate terminal $V_{g,ls}$ of the low-side switch $M_{LS}$.

By providing one or more of the above-mentioned devices, a particularly reliable control of the intermediate circuit 200 may be implemented.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

The invention claimed is:

1. A driver stage configured to switch an output node between a high-side potential and a low-side potential, wherein the driver stage comprises:
   a high-side switch arranged between the high-side potential and the output node;
   a low-side switch arranged between the output node and the low-side potential;
   an intermediate circuit arranged between the output node and an intermediate potential, wherein the intermediate potential lies between the high-side potential and the low-side potential; and
   a control unit configured to operate the driver stage at least in a high-side phase, in a low-side phase and in an intermediate phase, wherein:
      in the high-side phase, the high-side switch is closed, the intermediate circuit is open and the low-side switch is open, such that the output node is connected to the high-side potential;
      in the low-side phase, the low-side switch is closed, the intermediate circuit is open and the high-side switch is open, such that the output node is connected to the low-side potential; and
      in the intermediate phase for transiting from the high-side phase to the low-side phase or for transiting from the low-side phase to the high-side phase, the intermediate circuit is closed, the low-side switch is open and the high-side switch is open, such that the output node is connected to the intermediate potential,
   wherein the intermediate circuit comprises a main switching device configured to:
      couple the output node to the intermediate potential, when the main switching device is closed; and
      decouple the output node from the intermediate potential, when the main switching device is open,
   wherein the intermediate circuit is configured to maintain the main switching device open during the low-side phase and during the high-side phase, and
   wherein the intermediate circuit comprises:
      a pull-down device which is arranged between a gate terminal of the main switching device and the low-side potential;
      a pull-up device which is arranged between a gate terminal of the main switching device and a supply potential, wherein:
         the pull-down device is configured to connect the gate terminal of the main switching device to the low-side potential, when the driver stage is operated in the low-side phase; and
         the pull-up device is configured to connect the gate terminal of the main switching device to the supply potential, when putting the driver stage in the intermediate phase; and
      a control device which is arranged between a drain terminal of the main switching device and the intermediate potential, wherein the control unit is configured to close the control device to close the control device and to put the driver stage into the intermediate phase.

2. The driver stage of claim 1, wherein:
   the main switching device comprises
      a first main transistor; and
      a second main transistor; and
   the first main transistor and the second main transistor are arranged in a back-to-back configuration.

3. The driver stage of claim 2, wherein the main switching device comprises a clamping diode which is arranged between common source terminals and common gate terminals of the first and second main transistors.

4. The driver stage of claim 1, wherein the intermediate circuit is configured to generate an electrical path between the output node and the intermediate potential which comprises one of:
   the main switching device; and
   the main switching device and a control device.

5. The driver stage of claim 1, wherein a gate terminal of the pull-down device is coupled to a gate terminal of the low-side switch.

6. The driver stage of claim 1, wherein a gate terminal of the pull-up device is coupled to a control signal for controlling the low-side switch.

7. The driver stage of claim 1, wherein the control unit is configured to:
   maintain the driver stage in the high-side phase or in the low-side phase for a target duration; and
   maintain the driver stage in the intermediate phase for transiting from the high-side phase to the low-side phase or for transiting from the low-side phase to the high-side phase for an intermediate duration; wherein the intermediate duration is smaller than 10% of the target duration; or wherein the intermediate duration is greater than 0.1% of the target duration.

8. The driver stage of claim 1, wherein:
the high-side potential and the low-side potential have an opposite polarity with regards to one another; and
the intermediate potential is zero or ground.

9. A driver stage configured to switch an output node between a high-side potential and a low-side potential, wherein the driver stage comprises:
a high-side switch arranged between the high-side potential and the output node;
a low-side switch arranged between the output node and the low-side potential;
an intermediate circuit arranged between the output node and an intermediate potential;
wherein the intermediate potential lies between the high-side potential and the low-side potential; and
a control unit configured to operate the driver stage at least in a high-side phase, in a low-side phase and in an intermediate phase,
wherein:
in the high-side phase, the high-side switch is closed, the intermediate circuit is open and the low-side switch is open, such that the output node is connected to the high-side potential;
in the low-side phase, the low-side switch is closed, the intermediate circuit is open and the high-side switch is open, such that the output node is connected to the low-side potential; and
in the intermediate phase for transiting from the high-side phase to the low-side phase or for transiting from the low-side phase to the high-side phase, the intermediate circuit is closed, the low-side switch is open and the high-side switch is open, such that the output node is connected to the intermediate potential,
wherein the intermediate circuit comprises a main switching device configured to:
couple the output node to the intermediate potential, when the main switching device is closed; and
decouple the output node from the intermediate potential, when the main switching device is open,
wherein the intermediate circuit is configured to maintain the main switching device open during the low-side phase and during the high-side phase,
wherein the intermediate circuit comprises:
a pull-down device which is arranged between a gate terminal of the main switching device and the low-side potential;
a pull-up device which is arranged between a gate terminal of the main switching device and a supply potential, wherein:
the pull-down device is configured to connect the gate terminal of the main switching device to the low-side potential, when the driver stage is operated in the low-side phase; and
the pull-up device is configured to connect the gate terminal of the main switching device to the supply potential, when putting the driver stage in the intermediate phase;
a drain terminal of the main switching device is directly coupled to the intermediate potential; and
a gate terminal of the pull-up device is coupled to an inverted control signal for controlling the intermediate circuit to connect the output node with the intermediate potential, and
wherein the intermediate circuit comprises:
a fifth device which is arranged between the gate terminal of the main switching device and a dynamic ground node;
a control device which is arranged between the dynamic ground node and the intermediate potential; wherein the control device is controlled by a control signal for controlling the high-side switch;
a first device which is arranged between the supply potential and a gate terminal of the fifth device; wherein the first device is controlled by a control signal for controlling the low-side switch; and
a fourth device which is arranged between the gate terminal of the fifth device and the low-side potential; wherein a gate terminal of the fourth device is coupled to the gate terminal of the low-side switch.

* * * * *